(12) United States Patent
Boccanfuso

(10) Patent No.: US 9,081,487 B2
(45) Date of Patent: Jul. 14, 2015

(54) SYSTEM AND METHOD FOR MANIPULATING AN IMAGE

(71) Applicant: Giovan Giuseppe Boccanfuso, Heidelberg (CA)

(72) Inventor: Giovan Giuseppe Boccanfuso, Heidelberg (CA)

(73) Assignee: Agfa HealthCare Inc., Toronto (CA)

( * ) Notice: Subject to any disclaimer, the term of this patent is extended or adjusted under 35 U.S.C. 154(b) by 175 days.

(21) Appl. No.: 13/684,222

(22) Filed: Nov. 22, 2012

(65) Prior Publication Data

US 2014/0139446 A1 May 22, 2014

(51) Int. Cl.
G06F 3/0484 (2013.01)
G06F 3/0488 (2013.01)
G06T 3/60 (2006.01)

(52) U.S. Cl.
CPC .......... *G06F 3/04845* (2013.01); *G06F 3/0488* (2013.01); *G06T 3/60* (2013.01)

(58) Field of Classification Search
CPC ...... G06F 3/04845; G06F 3/0488; G06T 3/60
USPC ................................. 345/173–179; 178/18.03
See application file for complete search history.

(56) References Cited

U.S. PATENT DOCUMENTS

| | | | | |
|---|---|---|---|---|
| 7,461,349 B1 * | 12/2008 | Sharma et al. | | 715/770 |
| 7,812,826 B2 * | 10/2010 | Ording et al. | | 345/173 |
| 7,822,254 B2 | 10/2010 | Yatziv et al. | | |
| 8,320,647 B2 | 11/2012 | Djeridane | | |
| 2009/0096753 A1 * | 4/2009 | Lim | | 345/173 |
| 2009/0183930 A1 * | 7/2009 | Yang et al. | | 178/18.03 |
| 2010/0214607 A1 * | 8/2010 | Hepworth et al. | | 358/1.15 |
| 2010/0271398 A1 * | 10/2010 | Apted | | 345/650 |
| 2011/0209057 A1 * | 8/2011 | Hinckley et al. | | 715/702 |
| 2012/0176401 A1 * | 7/2012 | Hayward et al. | | 345/619 |
| 2012/0194540 A1 | 8/2012 | Reicher et al. | | |
| 2013/0187856 A1 * | 7/2013 | Konno et al. | | 345/163 |
| 2013/0236093 A1 * | 9/2013 | Gatt et al. | | 382/167 |

OTHER PUBLICATIONS

Patel, Nilay "Apple awarded limited patent on pinch-to-zoom." Oct. 13, 2010, retrieved from <http://www.engadget.com> retrieved on Sep. 7, 2012.

(Continued)

*Primary Examiner* — Amare Mengistu
*Assistant Examiner* — Jennifer Zubajlo
(74) *Attorney, Agent, or Firm* — Bereskin & Parr LLP/S.E.N.C.R.L.,s.r.l.

(57) ABSTRACT

A method and system for receiving input from a touch-sensitive device for manipulating an image shown in a display area. The method and system involve receiving an initial input for initializing an image manipulation for generating a mirror image in a mirroring direction, the mirroring direction is defined by a start and an end, the initial input corresponds to an initial location within the display area; receiving a first subsequent input corresponding to a first location, the first location corresponds to the start of the mirroring direction; receiving a second subsequent input corresponding to a second location, the second location corresponds to the end of the mirroring direction, the first and second locations are positioned on opposite sides of the initial location; and in response to the second subsequent input, generating the mirror image by mirroring the image according to the mirroring direction.

23 Claims, 6 Drawing Sheets

(56) References Cited

OTHER PUBLICATIONS

Ladin, Miriam et al. "Agfa HealthCare's IMPAX® 6 introduces volumetric management features at SIIM 2009", Jun. 4, 2009, Retrieved online. URL: http://www.agfahealthcare.com/global/en/main/news_events/news/archive/he20090604_SIIM.jsp; [retrieved on Jul. 15, 2014.].

* cited by examiner

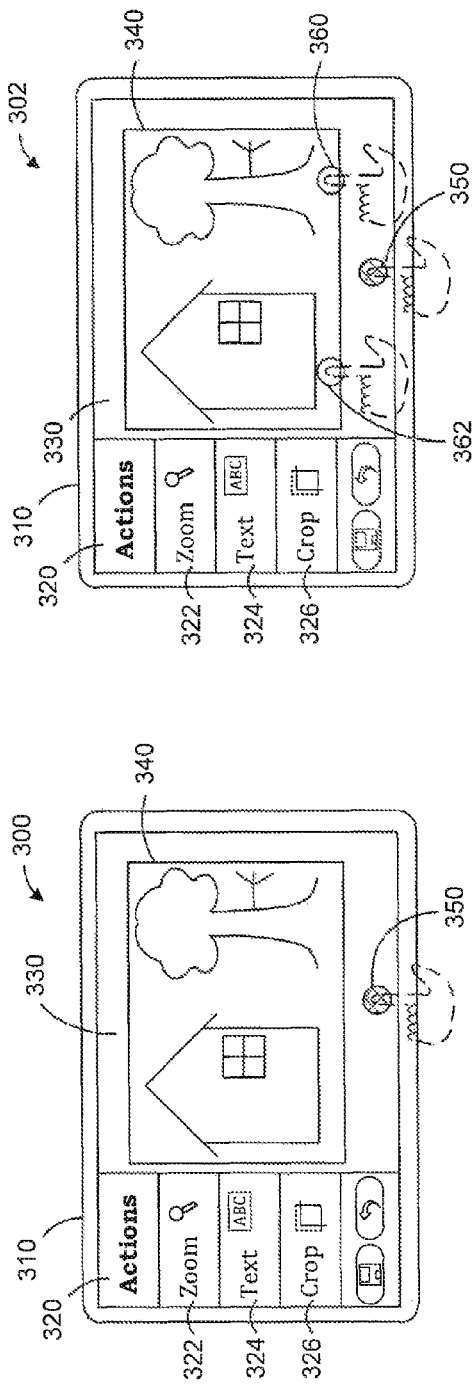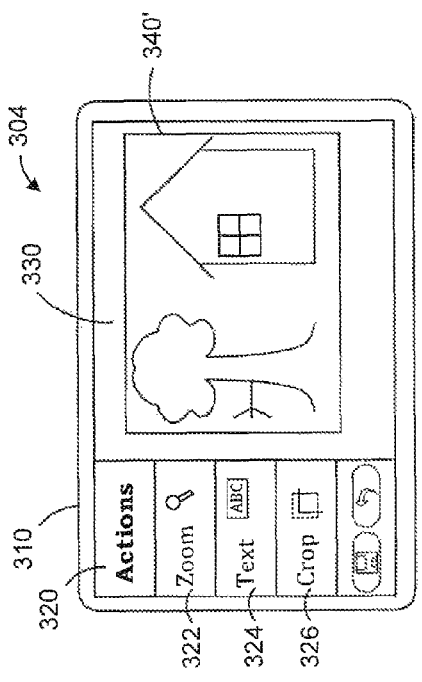

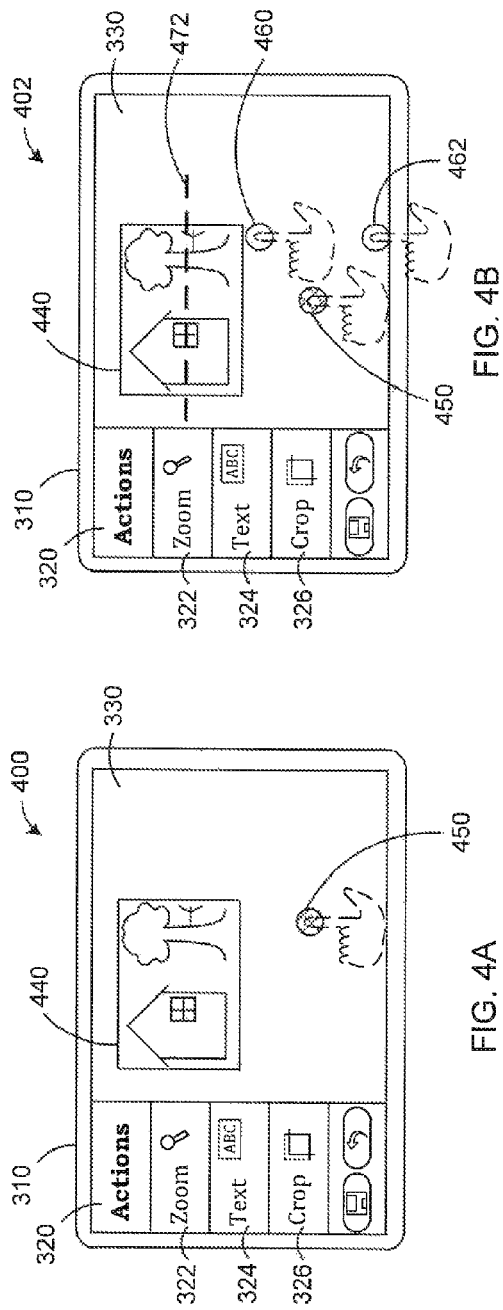
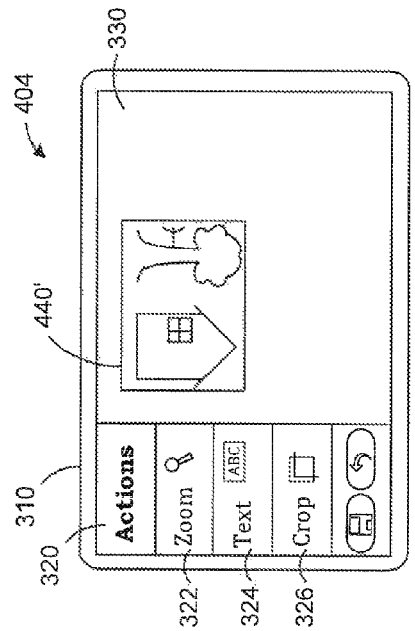
FIG. 4A
FIG. 4B
FIG. 4C

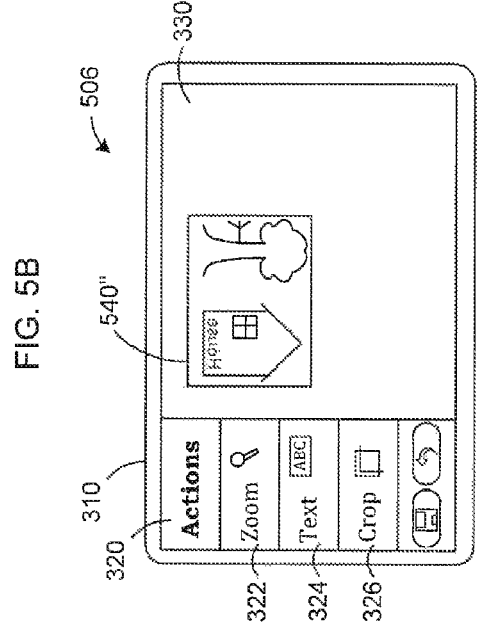
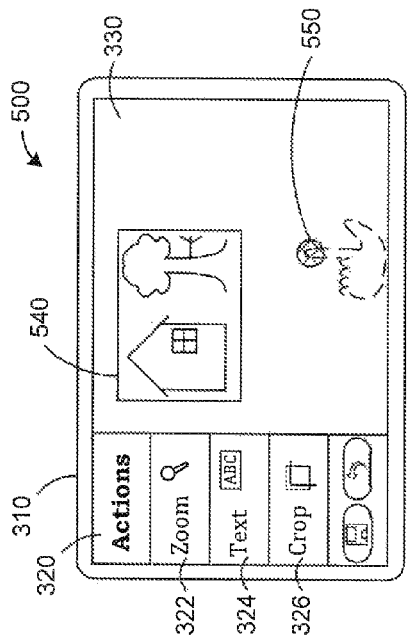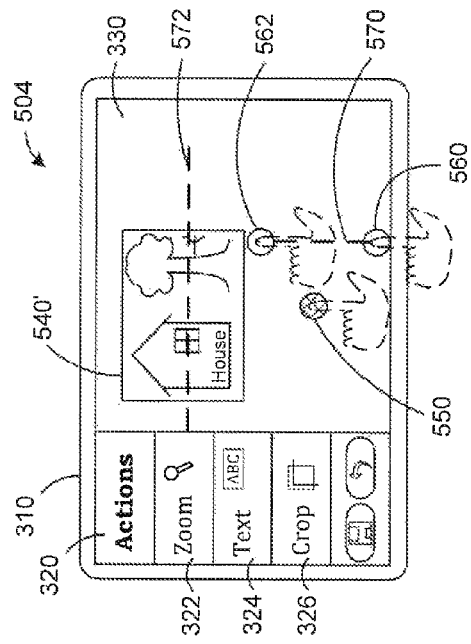

SYSTEM AND METHOD FOR MANIPULATING AN IMAGE

FIELD

The described embodiments relate to systems and methods for manipulating an image, and specifically, to systems and methods for manipulating an image for generating a mirror image of the image.

BACKGROUND

A variety of image manipulation functionalities are available in image processing technologies. Image manipulation functionalities are generally tools with which a user may modify and/or analyze an image within an image processing technology.

Typically, each image manipulation functionality is associated with a mode and that image manipulation functionality is available only when the associated mode is active, or activated by a user. Therefore, in order to switch from one image manipulation functionality to another, the active mode needs to be changed accordingly. For example, a user who wants process an image by zooming into an image and then conducting a measurement on the image, that user needs to activate a zoom mode for conducting an associated zoom functionality on the image and to switch from the zoom mode to a measurement mode for conducting an associated measurement functionality on that image. As image processing technologies develop, a greater variety of image manipulation functionalities become available. Therefore, the need to constantly switch between different modes can be inconvenient and inefficient for image processing. Easier access to image manipulation functionalities is, therefore, desirable.

Also, certain image manipulation functionalities may be used more frequently than others. For example, spatial transformation functionalities, such as rotating an image or zooming into an image, may be more frequently used than enhancement functionalities, such as altering a contrast of an image. Therefore, it may be helpful to make the more frequently used image manipulation functionalities more accessible.

Easier access to image manipulation functionalities may be especially important for touch-sensitive devices. Touch-sensitive devices commonly receive inputs in the form of single-touch inputs. Each single-touch input corresponds to an individual operation. Also, certain touch-sensitive devices may be associated with a more limited display area and therefore, effective use of the display area can be critical. Therefore, requiring a user to switch to a different mode in order to use a different image manipulation functionality can be cumbersome and impractical. Touch-sensitive devices with limited display area can also make switching between different modes difficult.

SUMMARY

In accordance with an embodiment of the invention, there is provided a method for receiving input from a touch-sensitive device for manipulating an image shown in a display area. The method comprises receiving an initial input for initializing an image manipulation for generating a mirror image in a mirroring direction, the mirroring direction is defined by a start and an end, the initial input corresponds to an initial location within the display area; receiving a first subsequent input corresponding to a first location within the display area, the first location corresponding to the start of the mirroring direction; receiving a second subsequent input corresponding to a second location within the display area, the second location corresponding to the end of the mirroring direction, the first and second locations are positioned on opposite sides of the initial location; and in response to the second subsequent input, generating the mirror image by mirroring the image according to the mirroring direction.

In accordance with an embodiment of the invention, there is provided a system for receiving input from a touch-sensitive device for manipulating an image shown in a display area. The system comprises a processor configured to receive an initial input for initializing an image manipulation for generating a mirror image in a mirroring direction, the mirroring direction is defined by a start and an end, the initial input corresponds to an initial location within the display area; receive a first subsequent input corresponding to a first location within the display area, the first location corresponding to the start of the mirroring direction; receive a second subsequent input corresponding to a second location within the display area, the second location corresponding to the end of the mirroring direction, the first and second locations are positioned on opposite sides of the initial location; and generate, in response to the second subsequent input, the mirror image by mirroring the image according to the mirroring direction.

In accordance with an embodiment of the invention, there is provided a non-transitory computer-readable medium upon which a plurality of instructions is stored. The instructions for performing the steps of the method comprising receiving an initial input for initializing an image manipulation for generating a mirror image in a mirroring direction, the mirroring direction is defined by a start and an end, the initial input corresponds to an initial location within the display area; receiving a first subsequent input corresponding to a first location within the display area, the first location corresponding to the start of the mirroring direction; receiving a second subsequent input corresponding to a second location within the display area, the second location corresponding to the end of the mirroring direction, the first and second locations are positioned on opposite sides of the initial location; and in response to the second subsequent input, generating the mirror image by mirroring the image according to the mirroring direction.

BRIEF DESCRIPTION OF THE DRAWINGS

A preferred embodiment of the present invention will now be described in detail with reference to the drawings, in which:

FIGS. 3A to 3C are screenshots illustrating a manipulation of an image in accordance with an example embodiment;

FIGS. 4A to 4C are screenshots illustrating a manipulation of an image in accordance with another example embodiment;

FIGS. 5A to 5D are screenshots illustrating a manipulation of an image in accordance with another example embodiment.

Figure 1:
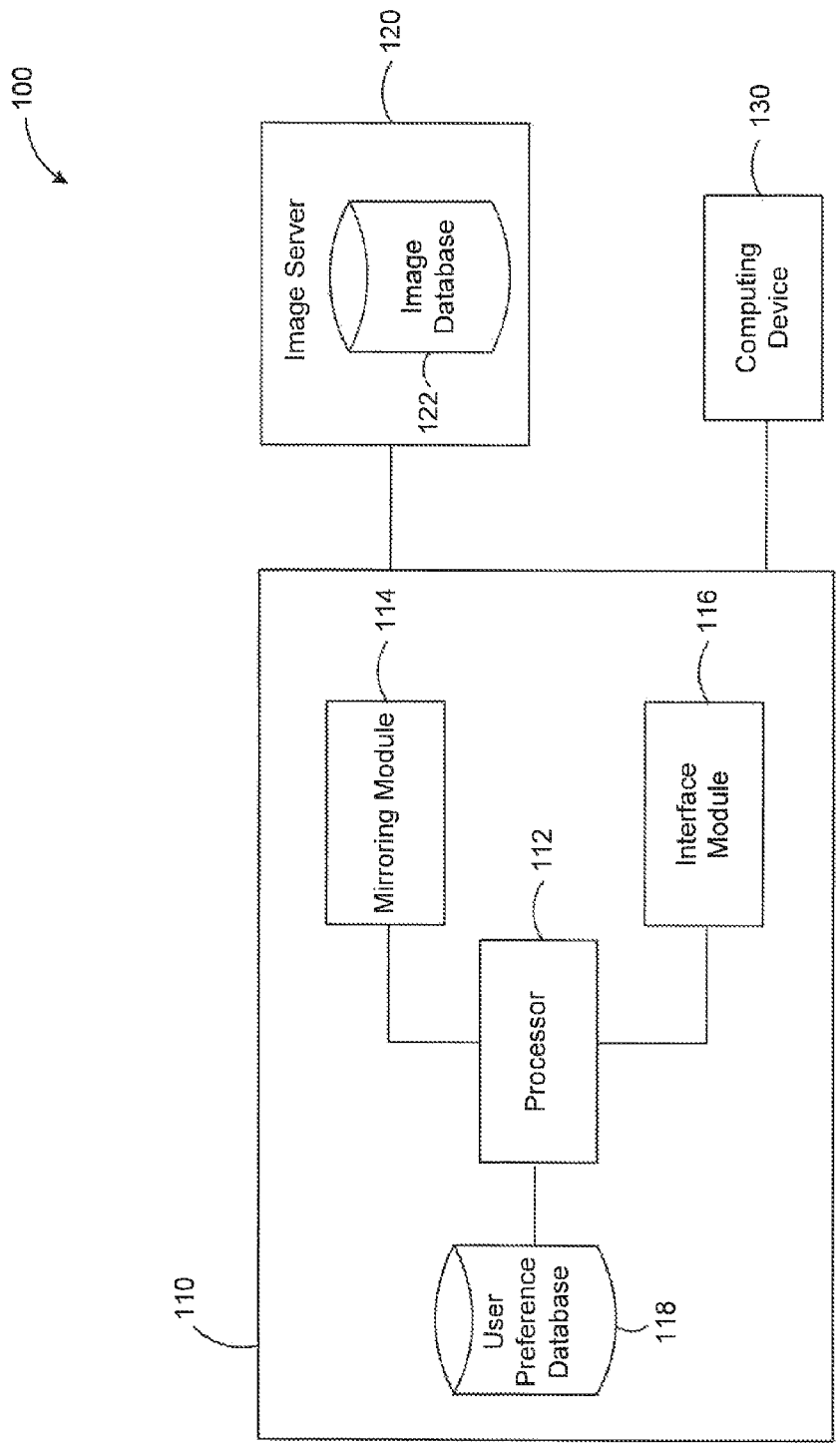
FIG. 1 is a block diagram of components interacting with an image processing system in accordance with an example embodiment.

The drawings, described below, are provided for purposes of illustration, and not of limitation, of the aspects and features of various examples of embodiments described herein. The drawings are not intended to limit the scope of the description in any way. For simplicity and clarity of illustration, elements shown in the figures have not necessarily been drawn to scale. Where considered appropriate, for simplicity and clarity of illustration, reference numerals may be repeated among the figures to indicate corresponding or analogous elements or steps.

DESCRIPTION OF EXEMPLARY EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, a suitable programmable computer may be a server, network appliance, embedded device, computer expansion module, personal computer, laptop, or any other computing device capable of being configured to carry out the methods described herein.

Program code may be applied to input data to perform the functions described herein and to generate output information. The output information is applied to one or more output modules, in known fashion. In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g. ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

The various embodiments described herein generally relate to methods (and associated systems configured to implement the methods) for receiving input from a touch-sensitive device for manipulating an image shown in a display area. Touch-sensitive devices commonly receive inputs in the form of single-touch inputs. Therefore, when processing an image, it can be tedious for a user to constantly switch between different modes in order to conduct different image manipulation functionalities. A universal access to common image manipulation functionalities, such as a function for generating a mirror image, can be helpful and practical for image processing technologies.

In the described systems, an initial input may be received for initializing an image manipulation for generating a mirror image in a mirroring direction. The initial input may be received without needing to switch from a current image manipulation mode. The initial input corresponds to an initial location within the display area. A first subsequent input, which corresponds to a first location within the display area, and a second subsequent input, which corresponds to a second location within the display area, may be received. The first and the second locations are positioned on opposite sides of the initial location. The mirroring direction is defined by a start and an end. The start of the mirroring direction corresponds to the first location and the end of the mirroring direction corresponds to the second location. After receiving the second subsequent input, the mirror image may be generated by mirroring the image according to the mirroring direction.

Reference is first made to FIG. 1, which illustrates a block diagram 100 of components interacting with an image processing system 110.

The image processing system 110 includes a processor 112, a mirroring module 114, an interface module 116 and a user preference database 118. It should be understood that the image processing system 110 may be implemented in hardware or software or a combination of both. It will be further understood that each of the modules in the image processing system 110 may be provided as separate hardware and/or software components, or combined together as one or more hardware and/or software components.

As shown in FIG. 1, the image processing system 110 may communicate, either directly or indirectly, with an image server 120 and a computing device 130. The image server 120 may include an image database 122 for storing, at least, image data and/or additional data corresponding to the image data. It will be understood that the image database 122 may instead be provided within the image processing system 110. It will be further understood that the image database 122 may include one or more data storage systems or devices. The computing device 130 may be any device that can be configured as a touch-sensitive device, such as a personal computer, laptop, personal data assistant, cellular telephone, smartphone device, tablet computer, and/or wireless device. It will be understood that, for ease of exposition, only one computing device 130 is illustrated in FIG. 1 but the image processing system 110 may be in communication with one or more computing devices 130.

As illustrated in FIG. 1, the processor 112 is configured to communicate with the mirroring module 114, the interface module 116 and the user preference database 118. The processor 112 may be configured to initiate and/or manage the operations of each of the other modules in the image processing system 110. The processor 112 may also determine, based on received data, stored data and/or user preferences stored in the user preference database 118, how the image processing system 110 may generally operate. The processor 112 may be configured to initiate the mirroring module 114 to generate a mirror image of an image. The processor 112 may receive data via the interface module 116 for identifying an image to be manipulated and/or further identifying what type of image processing is to be conducted on that image. The processor 112 may receive an image from the computing device 130 and be further configured to process the received image. The processor 112 may also be configured to retrieve an image from the image database 122 based on data received from the computing device 130. The processor 112 may be configured to retrieve the image from the image database 122 via the interface module 116.

The mirroring module 114 may be initiated by the processor 112 for generating a mirror image of an image. In some embodiments, the processor 112 may be configured to initiate the mirroring module 114 for generating the mirror image based on inputs received from the touch-sensitive device via the interface module 116 and/or user preference data stored in the user preference database 118. The processor 112 may be further configured to receive the mirror image from the mirroring module 114 and to provide the mirror image to the interface module 116 for display.

The interface module 116 may be a communication interface for receiving and/or transmitting data for the image processing system 110. For example, inputs from the touch-sensitive device may be received via the interface module 116. The interface module 116 may, in some embodiments, provide a user interface for receiving information into the image processing system 110. For example, the image processing system 110 may receive user preference data via a user preference interface and the processor 112 may then store the received user preference data into the user preference database 118. In a further example, the image processing system 110 may directly or indirectly communicate with the computing device 130 via the interface module 116. The image processing system 110 may operate with the interface module 116 for communicating with the computing device 130 over a network. Similarly, the image processing system 110 may directly or indirectly communicate with the image server 120 via the interface module 116. The image processing system 110 may operate with the interface module 116 to communicate with the image server 120 over a network.

The user preference database 118 may store information indicating how a user may prefer the image processing system 110 to operate. For example, the user preference database 118 may store information indicating a frame of reference, such as a mirroring axis, with which the mirroring module 114 is to generate a mirror image. The frame of reference may be an axis extending substantially from a center of the display area or an axis extending substantially from a center of the image. Alternatively, the mirroring axis may be substantially orthogonal to a triggering axis that extends between the first location and the second location. For example, the mirroring axis may be vertical when the triggering axis is substantially horizontal, the mirroring axis may be horizontal when the triggering axis is substantially vertical, and the mirroring axis may be diagonal when the triggering axis is substantially diagonal.

Figure 2:
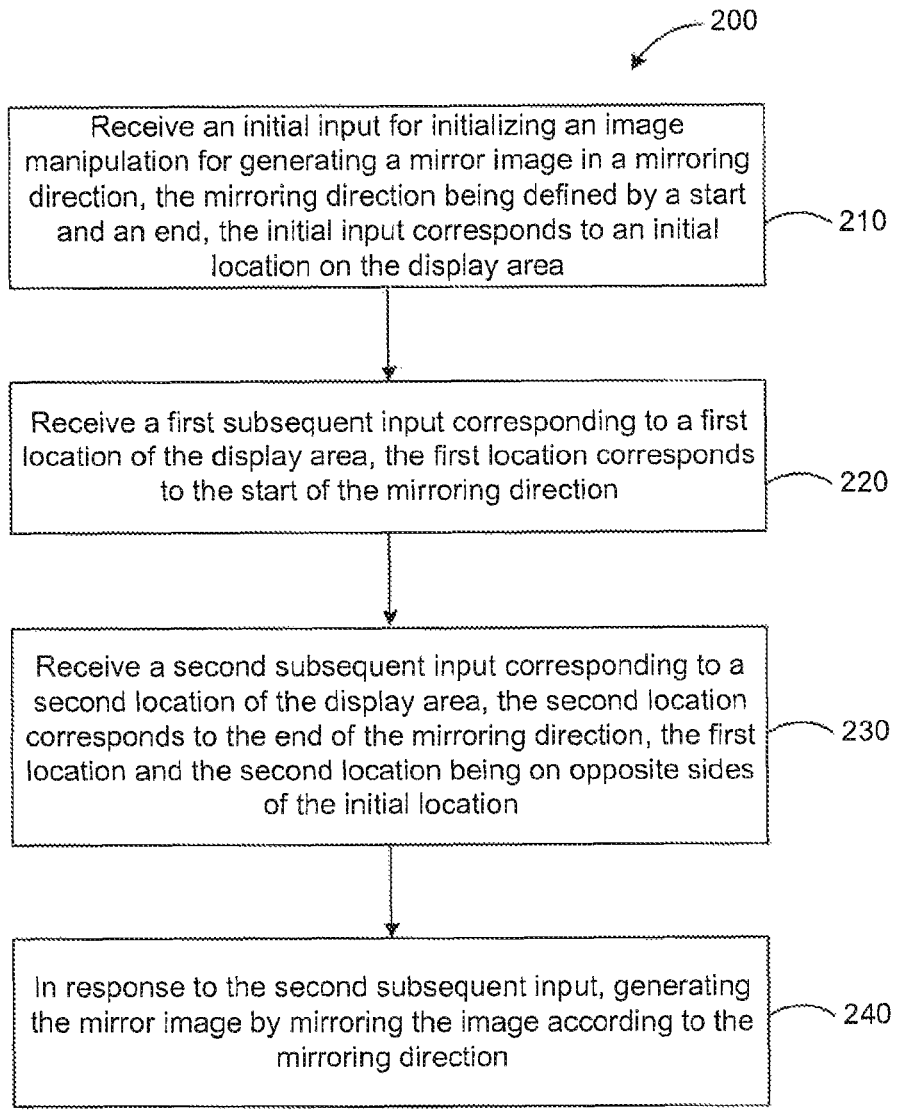
FIG. 2 is a flowchart diagram illustrating the steps of manipulating an image in accordance with an example embodiment.

Referring now to FIG. 2, steps for receiving input from the touch-sensitive device for manipulating an image shown in a display area are shown in a flowchart diagram 200. To illustrate the steps of the method, reference will be made simultaneously to FIGS. 3A to 3C, which illustrate screenshots of a manipulation of an image in accordance with an example embodiment.

At step 210, the processor 112 receives an initial input for initializing an image manipulation for generating a mirror image in a mirroring direction.

Reference is now made to FIG. 3A, which illustrates an example screenshot 300 of an image 340 to be manipulated.

The screenshot 300 is of a touch-sensitive device 310 with an image processing interface 320 and a display area 330 for displaying the image 340. The image processing interface 320 may include one or more available image manipulation functionalities, such as a spatial transformation functionality (e.g., a function to zoom within an image, or a zoom function 322), an annotation functionality (e.g., a function to add text to an image, or a text function 324), and/or an editing functionality (e.g., a function to crop an image, or a crop function 326). It will be understood that, for ease of exposition, only the zoom function 322, the text function 324 and the crop function 326 are illustrated in the example image processing interface 320. It will be further understood that other image processing functionalities may similarly be provided.

The initial input may correspond to an initial location 350 within the display area 330. As illustrated in FIG. 3A, the initial location 350 may be located anywhere within the display area 330. The initial location 350 may be located within the image 340 or may instead be located outside the image 340 but within the display area 330.

In some embodiments, the processor 112 may continuously receive the initial input until the mirror image is displayed. The initial input can therefore be a static input. For example, as illustrated in FIG. 3A, the initial input corresponding to the initial location 350 may be a finger input that is held within the display area 330 until the mirror image of the image 340 is displayed within the display area 330 (as shown in FIG. 3C, for example).

It will be understood that each of the initial input, the first subsequent input and the second subsequent input may be received from the touch-sensitive device 310 via a finger, a stylus, a pointing device and/or any other device configured for providing an input to the touch-sensitive device 310.

At step 220, the processor 112 receives a first subsequent input corresponding to a first location within the display area 330.

Reference is now made to FIG. 3B, which illustrate an example screenshot 302 of the image 340 being manipulated.

The processor 112 may receive the first subsequent input prior to receiving the second subsequent input. The first subsequent input may correspond to a first location 360 within the display area. Generally, the first location 360 may be located anywhere within the display area 330 as long as the first location 360 and a second location are positioned on opposite sides of the initial location 350.

In some embodiments, the processor 112 may receive the first subsequent input as a discrete input. Accordingly, processor 112 may receive the first subsequent input for a short period of time. For example, as illustrated in FIG. 3B, the first subsequent input corresponding to the first location 360 may be a finger input that is immediately released from the display area 330 after making contact with the display area 330.

At step 230, the processor 112 receives a second subsequent input corresponding to a second location within the display area 330.

Still referring to FIG. 3B, the second subsequent input may correspond to a second location 362 within the display area 330. Similar to the first location 360, the second location 362 may be located anywhere within the display area 330 as long as the first location 360 and the second location 362 are positioned on opposite sides of the initial location 350.

In some embodiments, similar to the first subsequent input, the processor 112 may receive the second subsequent input as a discrete input. The processor 112 may receive the second subsequent input for a short period of time. For example, as illustrated in FIG. 3B, the second subsequent input corresponding to the second location 362 may be a finger input that is immediately released from the display area 330 after making contact with the display area 330.

At step 240, the processor 112, in response to the second subsequent input, generates the mirror image by mirroring the image 340 according to the mirroring direction.

Referring now to FIG. 3C, which illustrates an example screenshot 304 of a mirror image 340' of the image 340 of FIGS. 3A and 3B. The mirroring direction can be defined by a start and an end. The processor 112 can generate the mirror image 340' by flipping the image 340 in a direction moving from the first location 360, which generally corresponds to the start of the mirroring direction, to the second location 362, which generally corresponds to the end of the mirroring direction.

In some embodiments, the processor 112 may, for generating the mirror image 340', determine a mirroring axis across which the mirror image 340' is generated. The mirroring axis may be a frame of reference with which the processor 112 may generate the mirror image 340'. For example, the mirroring axis may be defined within the user preference database 118 as an axis extending substantially from a center of the display area 330. Alternatively, the mirroring axis may be defined as an axis extending substantially from a center of the image 340. Referring briefly to FIGS. 4B and 4C, a mirroring axis 472 is defined as the axis extending substantially from a center of the image 440. Therefore, a mirror image 440' of the image 440, as shown in FIG. 4C, is generated with reference to the mirroring axis 472.

In some embodiments, the processor 112 may determine that the mirroring axis 472 is substantially orthogonal to a triggering axis that extends between the first location 360 and the second location 362. Similarly, the processor 112 may determine that a substantially vertical triggering axis may correspond to a horizontal mirroring axis, a substantially horizontal triggering axis may correspond to a vertical mirroring axis, and a substantially diagonal triggering axis may correspond to a diagonal mirroring axis. Referring briefly to FIG. 5C, for example, a triggering axis 570 extends between a first location 560 and a second location 562. Since the triggering axis 570 of FIG. 5C is substantially vertical, the processor 112 may determine that a corresponding mirroring axis 572 is horizontal.

As described above, the first location 560 and the second location 562 may generally be located anywhere within the display area 330 as long as the first location 560 and the second location 562 are located on opposite sides of the initial location 550. Accordingly, the processor 112 may not be able to easily determine whether the triggering axis 570 extending between the first location 560 and the second location 562 as being substantially vertical, horizontal or diagonal. The user preference database 118 may therefore include a triggering threshold that indicates when a triggering axis 570 may be considered vertical, horizontal or diagonal. For example, by applying the Cartesian coordinate system to the display area 330, the triggering threshold may indicate that a triggering axis 570 that varies within ±22.5° of the x-axis may be considered substantially horizontal, a triggering axis 570 that varies within ±22.5° of the y-axis may be considered substantially vertical, and any other triggering axis 570 may be considered substantially diagonal. It will be understood that other coordinate systems may be used for identifying a triggering threshold. It will be further understood that other triggering threshold values may be used.

As illustrated in FIG. 3O, the processor 112 may generate the mirror image 340' according to the mirroring direction. In some embodiments, the processor 112 may generate the mirror image 340' by storing an intermediary mirror image and then displaying the intermediary mirror image in the display area 330 as the mirror image 340'. For example, the processor 112 may store the intermediary mirror image in the image database 122 and may then retrieve the stored intermediary mirror image from the image database 122 for display within the display area 330. In some other embodiments, the processor 112 may generate the mirror image 340' by directly displaying the mirror image 340' within the display area 330. The mirror image 340' may be stored in the image database 122, for example. Alternatively, the mirror image 340' may be displayed within the display area 330 without being stored. However, the processor 112 may receive a request, via the interface module 116 for example, to store the mirror image 340'.

Referring now to FIGS. 4A to 4C, which illustrate screenshots of a manipulation of an image 440 in accordance with an example embodiment.

FIG. 4A illustrates an example screenshot 400 of the image 440 to be manipulated. The processor 112 receives an initial input that corresponds to an initial location 450 within the display area 330. Continuing with reference to FIG. 4B, which illustrates an example screenshot 402 of the image 440 being manipulated. The processor 112 receives a first subsequent input corresponding to the first location 460 and a second subsequent input corresponding to the second location 462. Accordingly, the processor 112 can generate a mirror image of the image 440 by flipping the image 440 in the mirroring direction moving from the first location 460 (which corresponds to the start of the mirroring direction) to the second location 462 (which corresponds to the end of the mirroring direction). FIG. 4C illustrates an example screenshot 404 of the mirror image 440' of the image 440 of FIGS. 4A and 4B. The processor 112 is further configured to generate the mirror image 440' with respect to the mirroring axis 472, which generally corresponds to an axis extending substantially from a center of the image 440.

Referring now to FIGS. 5A to 5D, which illustrate screenshots of a manipulation of an image 540 in accordance with an example embodiment.

Similar to FIGS. 3A and 4A, FIG. 5A illustrates an example screenshot 500 of the image 540 to be manipulated. FIG. 5A also illustrates receiving an initial input that corresponds to an initial location 550 within the display area 330.

Continuing with reference to FIG. 5B, which illustrates an example screenshot 502 of the image 540 being manipulated. In some embodiments, the processor 112 may be configured to receive, subsequent to receiving the initial input, one or more intervening inputs for conducting one or more intervening image manipulations to the image 540. Even though the processor 112 already received the initial input, the processor 112 may be configured to continue to receive one or more intervening inputs corresponding to intervening image manipulations before the first subsequent input is received. The processor 112 may receive the first subsequent input after the intervening image manipulations have completed and the processor 112 may thereafter generate a manipulated image.

The manipulated image may be generated by the processor 112 based on the one or more intervening image manipulations. For example, the intervening inputs may correspond to an active text function 324', which enables the processor 112 to receive inputs for adding text to the image 540. As illustrated in FIG. 5B, a text field 542 containing the word "House" has been added to the image 540. The processor 112 may then generate the manipulated image 540' (as shown in FIG. 5C) based on the intervening image manipulations conducted on the image 540. That is, the manipulated image 540' will include the image 540 as well as the text field 542. It will be understood that, for ease of exposition, only one intervening image manipulation is described in this example. It will be further understood that one or more intervening image manipulations may be applied to an image.

It will be understood that the one or more intervening image manipulations may include at least one of a spatial movement, a spatial transformation, a measurement, an annotation, an enhancement and an editing operation. The spatial movement manipulation may include any translation of an image. The spatial transformation manipulation may include a scaling of an image and/or a rotation of an image. The measurement manipulation may include providing a tool for measuring an angle and/or a distance within an image. The annotation manipulation may include a tool for adding text and/or markings to an image. The enhancement manipulation may include a tool for adjusting a contrast, a white balance, a window level and/or a brightness of an image. The editing operation may include a tool for cropping an image. It will be understood that other types of image manipulations may similarly be conducted as intervening image manipulations.

Continuing with reference to FIG. 5C, which illustrates an example screenshot 504 of the manipulated image 540' being further manipulated. Similar to FIGS. 3B and 4B, the processor 112 receives the first subsequent input corresponding to the first location 560 and the second subsequent input corresponding to the second location 562. In this example embodiment, however, the processor 112 is configured to generate a mirror image of the manipulated image 540' by determining the mirroring axis 572 across which the mirror image is to be generated. The processor 112 is further configured to determine the mirroring axis 572 with respect to the triggering axis 570. The triggering axis extends between the first location 560 and the second location 562.

Since the triggering axis 570 is substantially vertical, the processor 112 may be configured to determine that the mirroring axis 572 is horizontal. The processor 112 may proceed to generate a mirror image of the manipulated image 540' in the mirroring direction moving from the first location 560 to the second location 562, with respect to the mirroring axis 572. FIG. 5D illustrates an example screenshot 506 of a mirror image 540" of the manipulated image 540'.

Referring now to FIGS. 6A to 6D, which illustrate screenshots of a manipulation of an image 640 in accordance with an example embodiment.

Figure 6A:
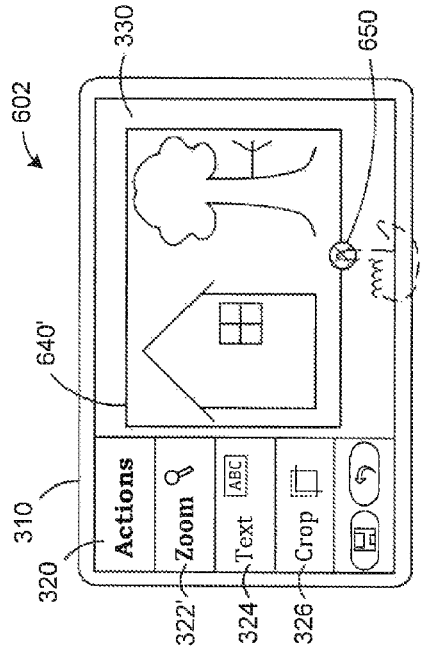
FIGS. 6A to 6D are screenshots illustrating a manipulation of an image in accordance with another example embodiment.

FIG. 6A illustrates an example screenshot 600 of the image 640 being manipulated. The zoom function 322 is available since the zoom mode is currently active. The active zoom function 322' provides a tool to zoom in and zoom out of the image 640 within the display area 330. In the zoom mode, the processor 112, therefore, operates to receive inputs for conducting the active zoom function 322'.

Figure 6C:
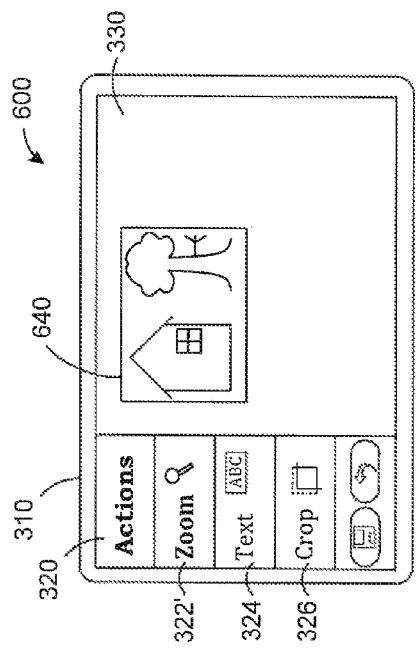
Figure 6B:
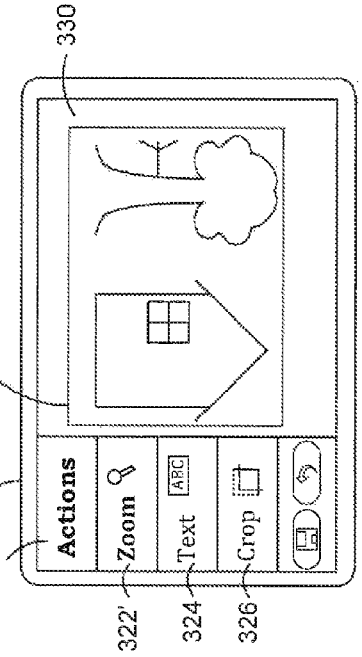

Continuing with reference to FIG. 6B, which illustrates an example screenshot 602 of a manipulated image 640' being further manipulated. As a result of the active zoom function 322', the processor 112 operated to zoom into the image 640 and to further generate the manipulated image 640', which corresponds to a zoomed-in version of the image 640. Since the zoom mode continues to be active, the active zoom function 322' continues to be available. Despite the zoom mode being active, the processor 112 may also be configured to receive the initial input corresponding to an initial location 650. The active zoom function 322' can therefore be referred to as a prior image manipulation since the processor 112 receives the initial input subsequent to receiving inputs corresponding to the active zoom function 322'.

In some embodiments, the processor 112 may be configured to receive the initial input during the prior image manipulation so that the prior image manipulation becomes suspended. For example, as illustrated in FIG. 6C, the active zoom function 322' enter a suspended mode, thereby becoming a suspended zoom function 322". The processor 112 may proceed to receive the first subsequent input corresponding to the first location 660 and the second subsequent input corresponding to the second location 662 for generating a mirror image of the manipulated image 640'. Similar to the example embodiment of FIG. 5C, the processor 112 is configured to generate a mirror image of the manipulated image 640 by determining the mirroring axis 672 across which the mirror image is to be generated. The processor 112 may be further configured to determine the mirroring axis 672 with respect to the triggering axis 670 which extends between the first location 660 and the second location 662. As illustrated in FIG. 6C, the triggering axis 670 is substantially vertical and therefore, the processor 112 may determine that the mirroring axis 672 is horizontal. After determining the mirroring axis 672, the processor 112 may proceed to generate the mirror image of the manipulated image 640' in the mirroring direction moving from the first location 660 to the second location 662 and with respect to the mirroring axis 672.

Figure 6D:
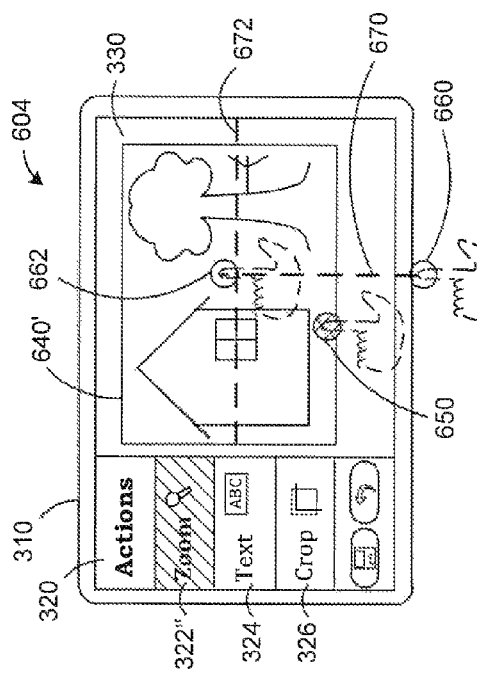

Referring now to FIG. 6D, which illustrates an example screenshot 606 of a mirror image 640" of the manipulated image 640'. After the mirror image 640" is generated, the processor 112 may reinstate the suspended zoom function 322" (that is, the suspended prior image manipulation). For example, the processor 112 may receive a notification from the mirroring module 114 indicating that the mirror image 640" has been generated and in response, the processor 112 may activate the zoom mode for providing the active zoom function 322'. The processor 112 may then receive inputs corresponding to the prior image manipulation, that is, the active zoom function 322', for continuing to manipulate the mirror image 640".

It will be understood that, like the intervening image manipulations described above, the prior image manipulation may include any one of the spatial movement, the spatial transformation, the measurement, the annotation, the enhancement and the editing operation.

As generally described above with respect to mirror images, the processor 112 may, in some embodiments, generate a manipulated image by storing an intermediary manipulated image and then displaying the intermediary manipulated image in the display area 330 as the manipulated image. For example, the processor 112 may store the intermediary manipulated image in the image database 122 and may then retrieve the stored intermediary manipulated image from the image database 122 for display within the display area 330. In some other embodiments, the processor 112 may generate the manipulated image by directly displaying the manipulated image within the display area 330. The manipulated image may be stored in the image database 122, for example. Alternatively, the manipulated image may be displayed within the display area 330 without being stored. However, the processor 112 may receive a request, via the interface module 116 for example, to store the manipulated image.

The present invention has been described here by way of example only. Various modification and variations may be made to these exemplary embodiments without departing from the spirit and scope of the invention, which is limited only by the appended claims. Also, in the various user interfaces illustrated in the figures, it will be understood that the illustrated user interface text and controls are provided as examples only and are not meant to be limiting. Other suitable user interface elements may be possible.

I claim:

1. A method for receiving input from a touch-sensitive device for manipulating an image shown in a display area, the method comprising:
   receiving an initial input for initializing an image manipulation for generating a mirror image in a mirroring direction, the mirror image corresponding to a mirror-reflected version of the complete image shown in the display area and the mirroring direction being defined by a start and an end, the initial input corresponding to an initial location within the display area;
   receiving a first subsequent input corresponding to a first location within the display area, the first location corresponding to the start of the mirroring direction;
   receiving a second subsequent input corresponding to a second location within the display area, the second location corresponding to the end of the mirroring direction, the first and second locations being positioned on opposite sides of the initial location; and
   in response to the second subsequent input, generating the mirror image by mirroring the image according to the mirroring direction.

2. The method of claim 1 wherein the initial input is continuously received until the mirror image is displayed, and each of the first and second subsequent inputs is received as a discrete input, the first subsequent input being received prior to the second subsequent input.

3. The method of claim 1 further comprising receiving, subsequent to receiving the initial input, one or more intervening inputs for conducting one or more intervening image manipulations to the image thereby generating a manipulated image;
   wherein,
      the first subsequent input is received subsequent to the manipulated image being generated; and
      the step of generating the mirror image by mirroring the image further comprises mirroring the manipulated image.

4. The method of claim 3, wherein the one or more intervening image manipulations comprises at least one of a spatial movement, a spatial transformation, a measurement, an annotation, an enhancement and an editing operation.

5. The method of claim 1, wherein the initial input is received during a prior image manipulation thereby suspending the prior image manipulation; and
   in response to the mirror image being displayed within the display area, reinstating the suspended prior image manipulation.

6. The method of claim 5, wherein the prior image manipulation comprises one of a spatial movement, a spatial transformation, a measurement, an annotation, an enhancement and an editing operation.

7. The method of claim 1, wherein the step of generating the mirror image further comprises:
   determining a mirroring axis across which the mirror image is generated, the mirroring axis being substantially orthogonal to a triggering axis extending between the first location and the second location; and
   mirroring the image with respect to the mirroring axis.

8. The method of claim 7, wherein the mirroring axis further corresponds to one of an axis extending substantially from a center of the display area and an axis extending substantially from a center of the image.

9. The method of claim 7, wherein the mirroring axis is vertical when the triggering axis is substantially horizontal.

10. The method of claim 7, wherein the mirroring axis is horizontal when the triggering axis is substantially vertical.

11. The method of claim 7, wherein the mirroring axis is diagonal when the triggering axis is substantially diagonal.

12. A non-transitory computer-readable medium upon which a plurality of instructions is stored, the instructions for performing the steps of the method as claimed in claim 1.

13. A system for receiving input from a touch-sensitive device for manipulating an image shown in a display area, the system comprising a processor configured to:
   receive an initial input for initializing an image manipulation for generating a mirror image in a mirroring direction, the mirror image corresponding to a mirror-reflected version of the complete image shown in the display area and the mirroring direction being defined by a start and an end, the initial input corresponding to an initial location within the display area;
   receive a first subsequent input corresponding to a first location within the display area, the first location corresponding to the start of the mirroring direction;
   receive a second subsequent input corresponding to a second location within the display area, the second location corresponding to the end of the mirroring direction, the first and second locations being positioned on opposite sides of the initial location; and generate, in response to the second subsequent input, the mirror image by mirroring the image according to the mirroring direction.

14. The system of claim 13, wherein the initial input is continuously received until the mirror image is displayed, and each of the first and second subsequent inputs is received as a discrete input, the first subsequent input being received prior to the second subsequent input.

15. The system of claim 13, wherein the processor is further configured to receive, subsequent to receiving the initial input, one or more intervening inputs for conducting one or more intervening image manipulations to the image thereby generating a manipulated image;
   wherein,
      the first subsequent input is received subsequent to the manipulated image being generated; and
      the step of generating the mirror image by mirroring the image further comprises mirroring the manipulated image.

16. The system of claim 15, wherein the one or more intervening image manipulations comprises at least one of a spatial movement, a spatial transformation, a measurement, an annotation, an enhancement and an editing operation.

17. The system of claim 13, wherein the initial input is received during a prior image manipulation thereby suspending the prior image manipulation; and the processor is further configured to reinstate, in response to the mirror image being displayed within the display area, the suspended prior image manipulation.

18. The system of claim 17, wherein the prior image manipulation comprises one of a spatial movement, a spatial transformation, a measurement, an annotation, an enhancement and an editing operation.

19. The system of claim 13, wherein the processor is further configured to:
  determine a mirroring axis across which the mirror image is generated, the mirroring axis being substantially orthogonal to a triggering axis extending between the first location and the second location; and
  mirror the image with respect to the mirroring axis.

20. The system of claim 19, wherein the mirroring axis further corresponds to one of an axis extending substantially from a center of the display area and an axis extending substantially from a center of the image.

21. The system of claim 19, wherein the mirroring axis is vertical when the triggering axis is substantially horizontal.

22. The system of claim 19, wherein the mirroring axis is horizontal when the triggering axis is substantially vertical.

23. The system of claim 19, wherein the mirroring axis is diagonal when the triggering axis is substantially diagonal.

* * * * *